Feb. 21, 1933.  C. B. O'CONNOR  1,898,567
VEHICLE
Filed June 20, 1930  2 Sheets-Sheet 1
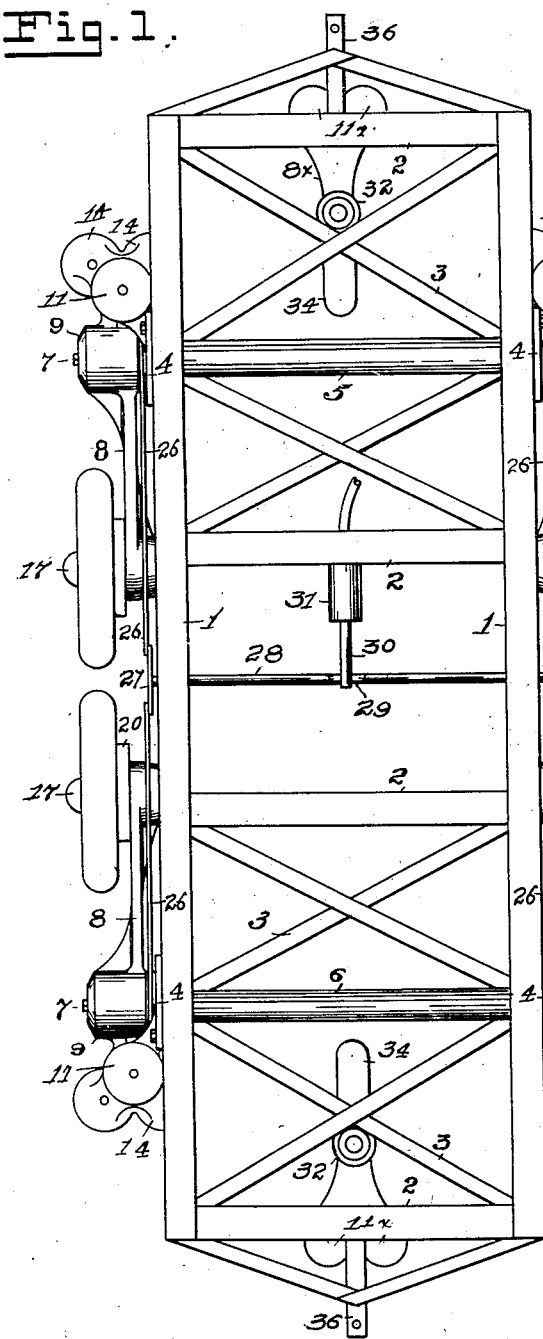
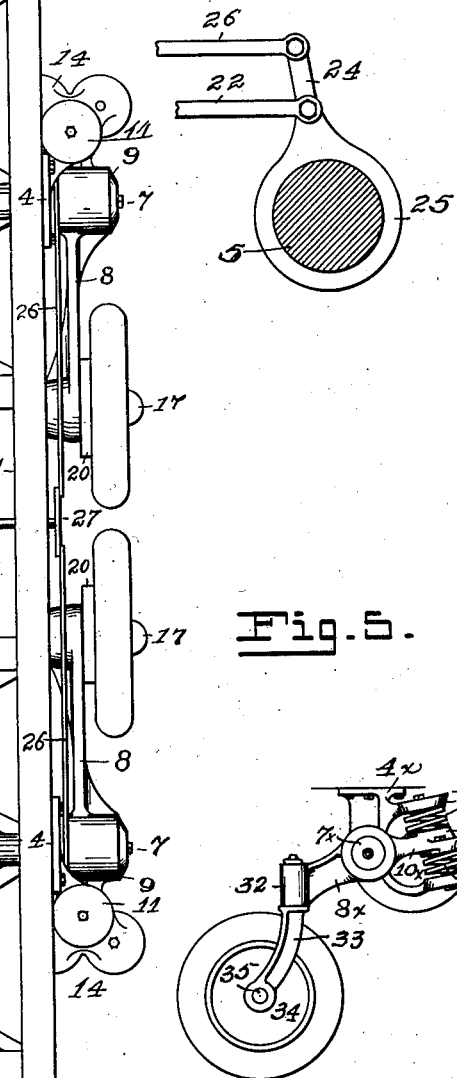
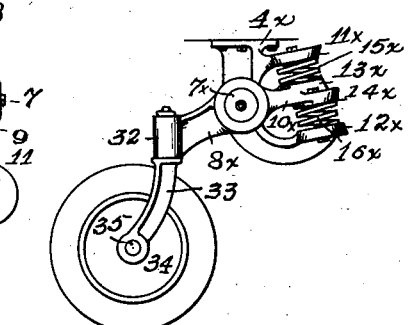
INVENTOR.
CLARA B. O'CONNOR
BY
ATTORNEY.

Feb. 21, 1933.        C. B. O'CONNOR        1,898,567
VEHICLE
Filed June 20, 1930        2 Sheets-Sheet 2

INVENTOR.
CLARA B. O'CONNOR.
BY
ATTORNEY.

Patented Feb. 21, 1933

1,898,567

UNITED STATES PATENT OFFICE

CLARA B. O'CONNOR, OF SAN FRANCISCO, CALIFORNIA

VEHICLE

Application filed June 20, 1930. Serial No. 462,592.

This invention relates to improvements in vehicles and more particularly to the running gear thereof.

Among the objects of the invention is to provide a running gear particularly applicable to trailers.

Another object is to give independent resilient freedom to each wheel mounting.

Another object is to so locate and mount the wheel support for the vehicle, that a train of trailers will " track " behind each other in turning corners.

Another object is to stabilize the spring suspension so that the rebound is absorbed and the spring tension held in equilibrium.

Other objects and advantages will appear as the description progresses.

In this specification and the accompanying drawings the invention is disclosed in its preferred form. It is to be understood, however, that it is not limited to this form because it may be embodied in other forms within the purview of the claims following the description.

In the accompanying two sheets of drawings:

Fig. 1 is a plan view from above of a highway trailer constructed in accordance with this invention.

Fig. 4 is a detached detail of the concentric pivot for the brake rod.

Fig. 5 is a side elevation of the adaptation of the spring suspension to caster wheels for supporting the ends of the trailer frame.

Figure 2:
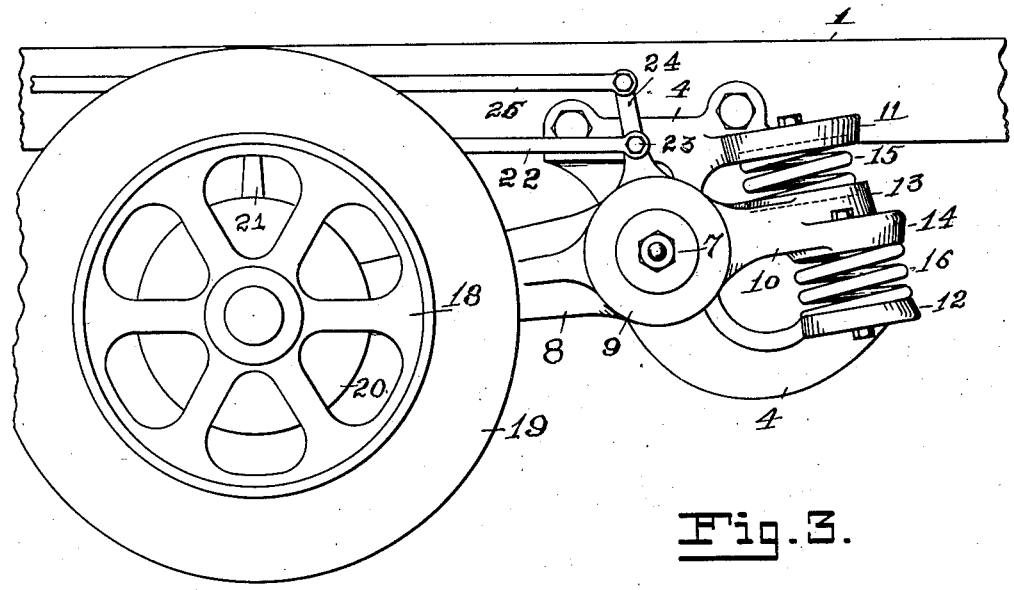
Fig. 2 is an enlarged detail in side elevation of one of the wheel mountings.
Figure 3:
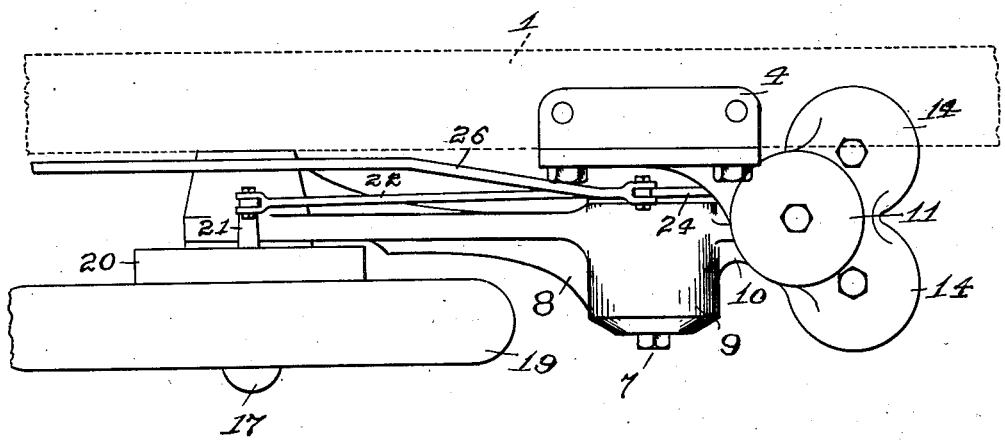
Fig. 3 is a plan view from above of the same.

In detail the construction illustrated in the drawings comprises the main frame having the side rails 1—1, with the interspaced cross beams 2—2, and the oblique braces 3—3, combined and arranged to form the conventional vehicle main frame. The details of the frame will vary according to the duties to be performed by the vehicle.

The particular advantages of this invention reside in the peculiar spring suspension and placement of the supporting wheels and their relation to each other, with respect to the load carried on the main frame.

It has been the practice heretofore to depend upon a long wheel base between transverse axle centers to minimize road shock.

The present invention departs from that practice and its disadvantages, by eliminating the transverse wheel axles and the long wheel base, by mounting each wheel with free, independent spring controlled vertical action with the shortest practical wheel base, for reasons which will be hereinafter more fully disclosed.

The mounting assemblies are the same for each wheel and comprise the bracket 4, fixed to the side rails 1 of the main frame. These brackets extend downward and support the transverse pivot shafts 5—6, extending across the main frame and laterally to form the pivots 7.

The cantilever crank arms 8 are pivoted intermediate their length on these pivot ends 7. It is desirable to interpose antifriction bearings within the pivot housings 9.

The short ends 10 of the arms 8, extend between the spring seats 11 and 12—12, preferably formed integrally with the brackets 4.

The nether seats 12—12 are formed on the extension 4' of the bracket.

Similar alined spring seats 13 and 14—14 are formed in opposing relation on the ends of the cantilevers 8. The springs 15—15 and 16 are interposed between these respectively opposed spring seats. The pair of springs 16—16 support the load and the spring 15 absorbs the rebound when the wheels meet and pass an inequality in the tractive plane.

The opposite ends of the arms 8 have outwardly extending crank pins or spindles 17 upon which the wheels 18 are mounted with interposed antifriction bearings. The wheels are shod with any form of resilient tires 19 where conditions require it.

When the wheel rides up an obstruction, the springs 16—16 are compressed. When it descends the springs 16—16 expand against the tension of the spring 15, which absorbs the rebound shock which would otherwise occur. A depression in the road plane has a reverse effect on the spring suspension. The action and reaction of the spring suspension is so rapid that the tire 19 is maintained in constant tractive contact with the road surface, without appreciably raising and lowering the main frame.

Thus mounting the wheels on independent spring suspensions, remote from the axes of the wheels, tends to maintain a fixed center of gravity in the load. This avoids the initiation of rhythmical swaying and bouncing of the load, concomitant with running gears wherein the wheels are mounted in pairs on axles extending transversely across the main frame.

The independent mounting of the wheels has the further advantage that a short wheel base can be concentrated at the longitudinal center of the load, without causing the load to "buck" up and down in passing over an obstruction, which is met seriatim by the "tracking" wheels, without influencing the wheels supporting the opposite side of the vehicle.

Concentrating the wheel base at the center of the load, has the further advantage, that the trailer will track behind the tractor or draft vehicle. This cannot be accomplished with a long wheel base on the trailer.

This form of wheel spring suspension is especially adaptable for the rear wheels of front drive motor vehicles. The independent operation of the trailing wheels insures easy riding qualities the full length of the vehicle.

The wheel brakes are conventional and consist of the drums 20 fixed to the wheels 18, and may have internal expanding brake shoes or external bands contracting against the drums, in the usual manner.

The brakes are applied by the levers 21 fulcrumed on the arms 8 and operatively engaging the brakes. These levers are connected by the links 22 pivoted at 23 to the floating levers 24 having the bands 25 encircling the pivot shafts 5—6 and operating concentrically with the axes thereof. Thus connected, the wheels can rise and fall without appreciably altering the brake adjustments.

These floating levers 24—24 are connected by the drag links 26 with the opposite ends of the cranks 27—27, centrally fixed on the cross shaft 28, which has the crank 29 thereon.

This crank 29 is connected with the piston rod 30 of the pressure cylinder 31, or otherwise connected with the main braking system of the tractor and the other trailers in the train. The operation of the crank 29 operates the brakes on all the wheels 18.

If hydraulic brakes are used, the individual brakes can be operated through flexible conduits and the mechanical lever system above described dispensed with.

A modification of the invention is shown in Fig. 5, adapted to the mounting of caster wheels. The bracket 4x is attachable to the main frame. The pivot 7x is formed on this bracket and provided with an antifriction bearing. The arm 8x is fulcrumed on the pivot bearing 7x.

The forward extension 10x, extends between the spring seats 11x, 12x and has the opposed seats 13x, 14x formed thereon. The springs 15x and 16x—16x are interposed between these respective seats and operate as previously described.

The opposite end of the arm 8x is provided with a vertical socket 32, to receive the neck of the yoke 23, adapted to caster or swivel therein. The wheel 34 is mounted upon the spindle 35, and provided with a suitable tire.

These caster wheels may be mounted at one or both ends of the main frame of the trailer. They may be mounted upon retractable brackets so that they may be lowered only when the trailer is disconnected from the supporting effect of the draft bars 36 and the tractor. These caster wheels may also be mounted above the level of the plane of the wheels 18 and only come into action when excessive rocking of the trailer frame requires their support, thus saving tire wear on the caster wheels.

Attention is directed to the placement of the spring seat 11 with respect to the seats 12 and the pivotal center 7. Being closer to the center 7 the leverage against it is less, which has the effect of reducing the reactive effect of the spring. This is desirable from an economic standpoint, since the springs 15 and 16 may be duplicates. The supporting effect of the springs 16 may be increased by multiplying the number, and the tension of the spring 15 reduced by shortening the leverage from the spring to the center 7, as stated.

Having thus described this invention, what I claim and desire to secure by Letters Patent is:

1. A vehicle having a main frame; a plurality of pivots on said frame; arms pivoted intermediate their lengths on said pivots; wheels mounted on one of the ends of said arms; opposed spring seats on the opposite ends of said arms, one of said seats being closer to said pivotal center; brackets on said frame having spring seats in opposed relation to said spring seats on said arms, respectively; and springs interposed between said spring seats.

2. A vehicle having a main frame; a plurality of pivots on said frame; arms pivoted intermediate their lengths on said pivots; wheels mounted on one of the ends of said arms, a spring seat on the upper side of the opposite end of each of said arms, a plurality of nether spring seats on the underside of each of said arms opposite to said upper spring seats; brackets on said frame having spring seats in opposed relation to each of said spring seats on said arms, respectively, and springs interposed between said spring seats.

3. A vehicle having a main frame; a plurality of substantially straight arms pivoted intermediate their lengths to said frame; wheels mounted on one of the ends of said arms; a pair of spring seats in transverse alignment on the underside of the opposite ends; a spring seat on the upper side of each of said arms opposite said nether spring seats, said upper spring seats being closer to said pivotal center; brackets on said frame having spring seats in opposed relation to each of said spring seats on said arms, respectively; and springs interposed between said spring seats.

In testimony whereof I have hereunto set my hand this 16th day of June, 1930.

CLARA B. O'CONNOR.